Jan. 24, 1956 W. S. BOALS 2,731,975
FLUID PRESSURE REDUCING AND REGULATING VALVE
Filed Feb. 6, 1952 2 Sheets-Sheet 1

INVENTOR.
WAYNE S. BOALS,
BY
Nicholas T Volk
ATTORNEY.

Jan. 24, 1956  W. S. BOALS  2,731,975
FLUID PRESSURE REDUCING AND REGULATING VALVE
Filed Feb. 6, 1952  2 Sheets-Sheet 2
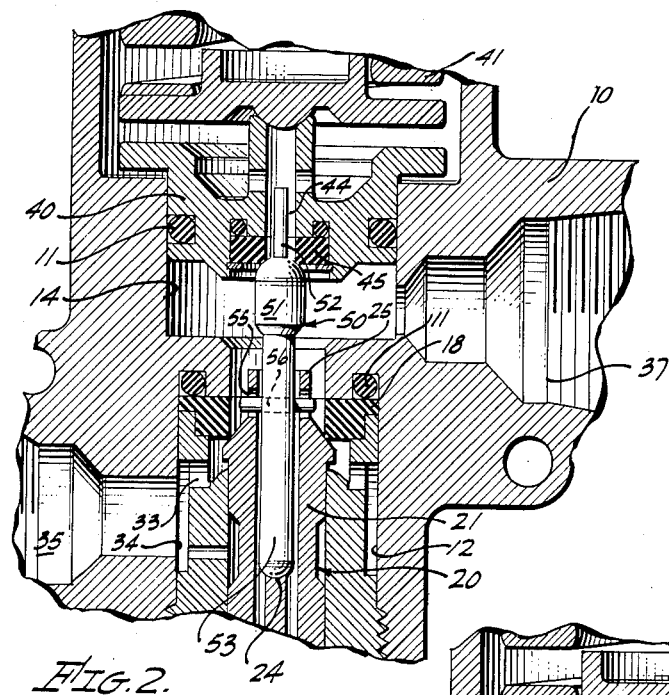
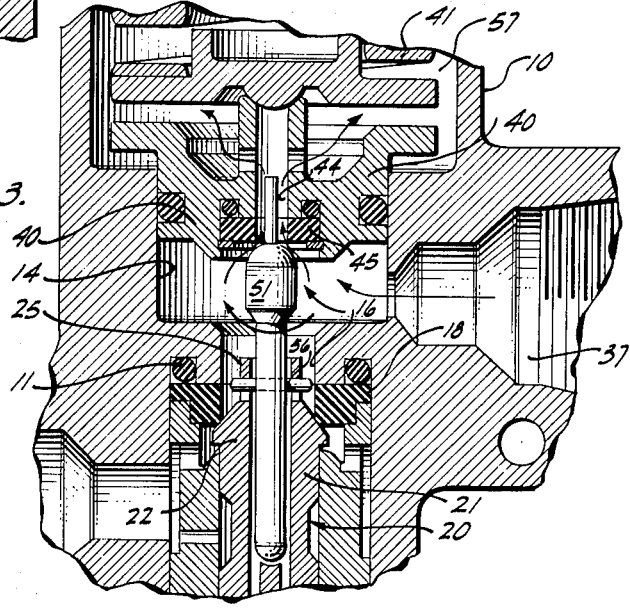
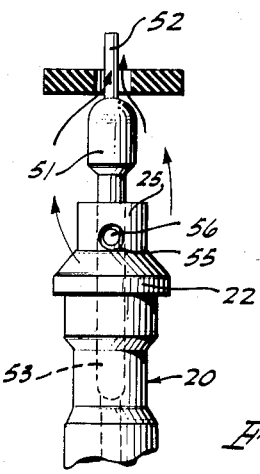
INVENTOR.
WAYNE S. BOALS,
BY
ATTORNEY.

United States Patent Office 2,731,975
Patented Jan. 24, 1956

2,731,975

FLUID PRESSURE REDUCING AND REGULATING VALVE

Wayne S. Boals, Los Angeles, Calif., assignor to Hughes Tool Company, Houston, Tex., a corporation of Delaware Application February 6, 1952, Serial No. 270,209

4 Claims. (Cl. 137—116.5)

This invention relates to fluid pressure reducing and regulating valves and more particularly to fluid pressure reducing and regulating valves for reducing the fluid pressure from a source of high pressure and maintaining the reduced fluid pressure between predetermined minimum and maximum values.

Where conservation of space is an important factor in the design of power operated equipment, the use of compressed air as a source of power has become an accepted practice. Such is the case in modern aircraft, where lightweight pneumatically operated rams are used to operate various parts of the plane as well as auxiliary pieces of equipment. Air is compressed to pressures of the order of 3000 pounds per square inch and stored in suitable containers for release at lower usable pressures of the order of 100 pounds per square inch to supply the rams with power. In this manner, an adequate volume of compressed air can be stored in a relatively small space, providing its release is properly controlled. Releasing air from the container decreases the pressure therein as well as the volume; therefore, to assure uniform operation of the pneumatically operated rams, the release of air pressure within closely regulated limits is of prime importance.

It is an object of this invention to provide a device for reducing fluid pressure and for maintaining the reduced pressure between predetermined limits, and to provide such a valve which is free of astatic tendencies.

It is another object to provide a fluid pressure regulating valve which includes a pressure inlet valve mechanically coupled to a pressure relief valve.

An additional object of this invention is to provide a fluid pressure reducing regulator having inlet and outlet chambers with a pressure inlet valve which responds to fluid pressure in the outlet chamber only.

It is also an object to provide such a regulator with a pressure relief valve located within the outlet chamber.

A further object is to provide such a regulator with means within the outlet chamber and responsive to fluid pressure therein for actuating both the pressure inlet valve and the pressure relief valve.

Still another object of this invention is to provide a fluid pressure regulator in which the pressure responsive control means includes a spring-loaded piston in the outlet chamber having an exhaust port for releasing pressure in the outlet chamber.

It is also an object to provide such a regulator with a relief valve for holding the exhaust port closed until a predetermined pressure has been reached in the outlet chamber.

It is an additional object to provide such a relief valve which opens to a maximum when the predetermined pressure has been reached.

It is a further object to provide a pressure reducing regulator in which the closing of the relief valve is accomplished by the application of force to open the pressure inlet valve.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figs. 2 and 3 are fragmentary sections of the regulator shown in Fig. 1;

Fig. 4 is a side elevation of the mechanically coupled valve structure.

Figure 1:
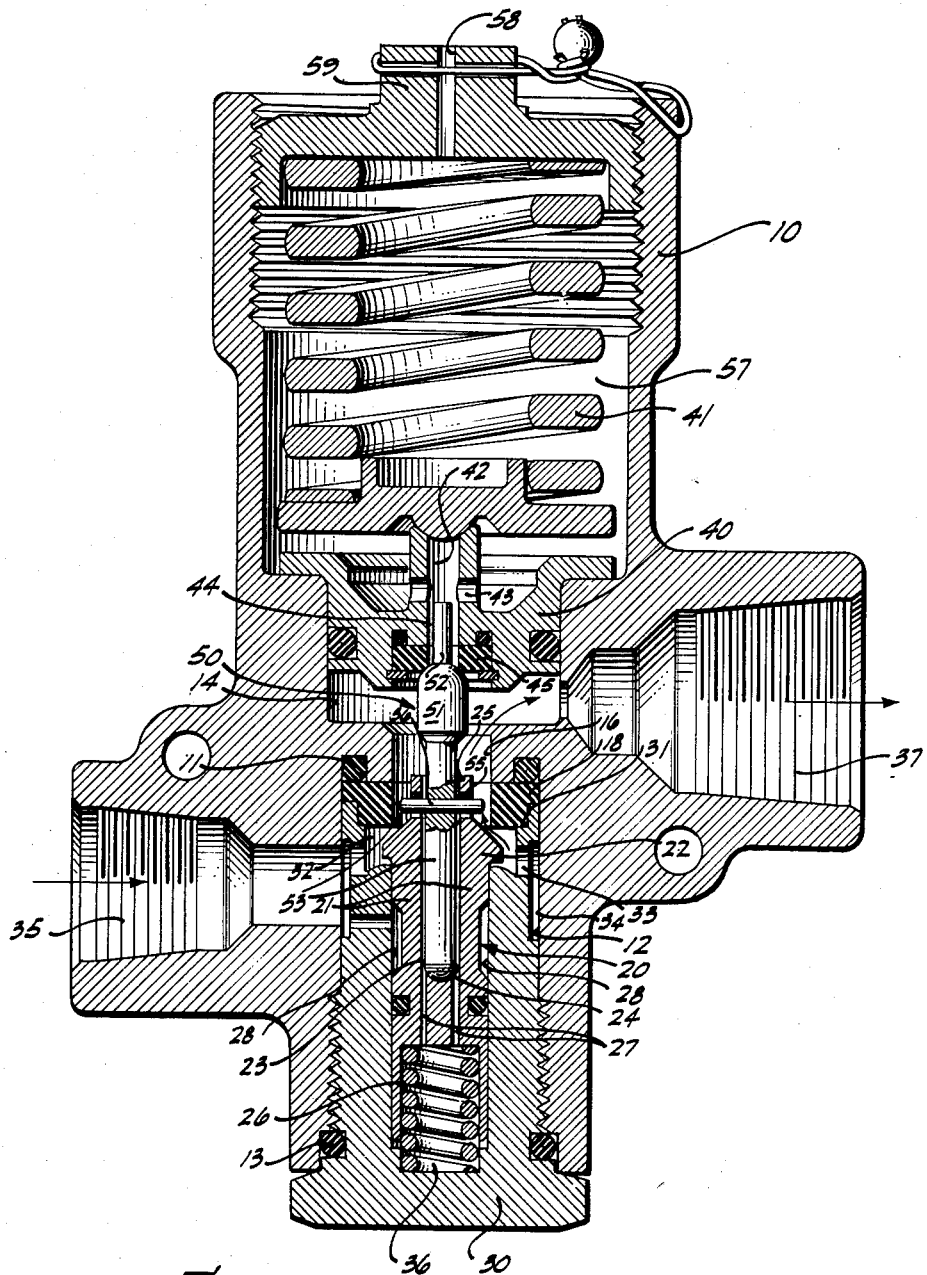
Fig. 1 is a sectional elevation of a pressure reducing regulator embodying the invention.

This invention combines a pressure reducing valve and a pressure relief valve in a simple unitary structure illustrated in Fig. 1. A body member 10 is provided with an inlet pressure chamber 12 and an outlet pressure chamber 14 both of which are bored into body 10 in axial alignment, and are interconnected by a fluid conducting inlet port 16 having a valve seat 18.

A poppet type inlet valve, indicated generally by reference numeral 20, includes a cylindrical body 21 having a frusto-conical valve head 22 formed adjacent the upper end thereof, a bore 23 extending through valve head 22 axially into body 21 terminating in a concave bottom wall 24, and a collar 25 formed on the upper end of body 21, which collar projects above valve head 22.

A valve guide 30 threadedly secured in the bore which forms inlet pressure chamber 12 is provided with a bore 28 to slidably receive cylindrical valve body 21 for guiding valve head 22 into full engagement with valve seat 18 to close inlet port 16. It is to be noted that guide 30 also retains valve seat 18 in its proper relationship with port 16 by means of an internal shoulder 31 formed in a counterbore 32 in the upper end of guide 30. Counterbore 32, radial openings 33, and annular groove 34, on the outer surface of guide 30, comprise the remaining space of inlet pressure chamber 12, since the bore forming the chamber is practically filled with valve 20 and guide 30.

A second bore 26 extending a short distance into the lower end of valve body 21 contains a compression spring 36 which acts against the bottom of bore 28 in guide 30 to continuously urge valve 20 in a direction to close port 16. In other words, spring 36 pushes against body 21 urging the body and its integral valve head 22 toward valve seat 18.

In outlet pressure chamber 14, a piston 40 is slidably disposed for limited movement in the bore forming chamber 14, and is continuously urged in a downward direction by a compression spring 41, but is movable upward in the opposite direction by a force overcoming the pressure of the spring. Piston 40 includes a fluid conducting passageway comprising a bore 42, radial holes 43, and a relief port 44 having a valve seat 45. Port 44, when open, as illustrated in Figs. 3 and 5, interconnects the passageway with the outlet pressure chamber 14.

A poppet type relief valve 50 includes a valve head 51 having a convex spherical surface for engagement with valve seat 45 to close relief port 44, and a guide stem 52 extending from the spherical surface and loosely fitting port 44 and bore 41 to insure adequate alignment of valve head 51 with valve seat 45. Relief valve 50 further includes a main valve stem 53 which extends from head 51 into bore 23 of inlet valve 20 to engage the concave bottom wall 24, as illustrated in Figs. 2 and 3, and provide a mechanical coupling or connection between relief valve 50 and inlet valve 20. Stem 53 loosely fits bore 23 to avoid frictional restraint when the stem moves upward as will be described later. It is to be noted that the end of stem 53 is shaped complementary to the concave configuration of wall 24 to centralize the end of the stem so that any force appiled to valve 20 by stem 53 of valve 50 will be directed along the axis of valve 20.

Diametrically opposite holes 55 are drilled radially through collar 25 on the upper end of cylindrical body 21 to provide openings for engagement with a pin 56 secured in a radially drilled hole through main valve stem 53 of valve 50. As illustrated in Fig. 1 and Fig. 4, pin 56 is smaller in diameter than holes 55, and is located in stem 53 so as not to engage the sides of holes 56 when the end of stem 53 is in contact with bottom wall 24 of bore 23. This arrangement permits the end of the stem to exert pressure on wall 24 without interference from pin 56. The relationship between the size of holes 55 and the diameter of pin 56, and the relationship of their location with respect to each other determines the amount of axial movement of stem 53 in bore 23, the importance of which will be later described.

The operation of the invention is as follows:

As illustrated in Fig. 1, piston 40 is in its lowermost or first position, and is urged to that position by compression spring 41. Valve seat 45, in full engagement with the convex spherical surface of valve head 51, closes relief port 44 of piston 40 and, under the force exerted by spring 41, causes valve stem 53 of relief valve 40 to unseat valve head 22 of inlet valve 20 against the force exerted by spring 36. Thus, this simple mechanical coupling between the end of valve stem 53 of relief valve 50 and the wall 24 of valve 20 opens inlet port 16.

Assume that a source of air compressed to high values of pressure is connected to inlet pressure chamber 12 by means of a threaded opening 35 in body 10, and that a system or device requiring compressed air at lower pressure values is connected to outlet pressure chamber 14 by means of a threaded opening 37 also in body 10. Then, when inlet port 16 is open, compressed air from inlet chamber 12 will flow through the open port into outlet chamber 14 and the device or system connected to the outlet chamber. As the device or system fills with air, the pressure therein will rise and cause an increase in the pressure in the outlet chamber. Piston 40, movable in chamber 14, will respond to the increased pressure and move upward against the force of spring 41 when the pressure in the outlet chamber has reached the required value necessary to overcome the force of the spring. If the lower pressure values assumed above range between a minimum value of 100 pounds per square inch and a maximum value of 105 pounds per square inch; then spring 41 is proportioned and adjusted so that air pressure having a value of 100 pounds per square inch in outlet chamber 14 will move piston 40 upward to a second position which permits spring 36 to move inlet valve 20 upward until valve head 22 is in full engagement with valve seat 18 to thereby close inlet port 16, as shown in Fig. 2.

If for any reason the pressure in the outlet chamber 14 increases above the minimum value of 100 pounds per square inch, piston 40 responds to the increased pressure and continues its movement upward in the outlet chamber. In moving upward, valve head 51 of relief valve 50 continues to engage valve seat 45 and hold relief port 44 closed because of the favorable difference between the pressure in the outlet chamber 14 and the pressure in the relief port 44. If the pressure in the outlet chamber should reach the maximum value of the low pressure range, which value was assumed to be 105 pounds per square inch, then piston 40 will move to a third position as illustrated in Fig. 3.

In moving to the third position, relief valve 50 is stopped in its travel upward by pin 56 as it engages the upper sides of holes 55 in collar 20 of inlet valve 20. When valve 50 is stopped from further movement with piston 40, the slightest disturbance of the engagement between valve head 51 and valve seat 45 breaks the seal and allows compressed air to exhaust through port 44 and the fluid conducting passageway consisting of bore 42 and radial holes 43, thence into a compartment 57 which is vented to atmospheric pressure by a vent 58 in spring adjusting cap 59, as shown in Fig. 1. When the seal between valve head 51 and valve seat 45 is broken, port 44 is instantly opened to its full extent. This is an important feature of the invention because it provides a positive means of eliminating undesirable fluctuations of pressure above the maximum limit of the predetermined pressure range.

In describing the upward movement of piston 40 to a second position in response to pressure within outlet chamber 14, it was assumed that spring 41 is proportioned for adjustment by means of a cap 59, Fig. 1, to permit inlet valve 20 to close inlet port 16 when air pressure within chamber 14 has reached a value of 100 pounds per square inch. In this manner, the minimum value of the low pressure range is predetermined, and can be easily altered within the limits of spring 41 by altering the position of adjusting cap 59, because the movement upward of piston 40 is directly proportioned to the air pressure in chamber 14.

After piston 40 has moved to the second position, where inlet port 16 is closed by inlet valve 20, the third position of piston 40 is determined by the distance valve 50 moves with the piston in response to air pressure within the outlet chamber 14 before the movement is stopped by pin 56 when it engages the upper side of holes 55. Since, as stated above, the movement of piston 40 is proportional to the air pressure within chamber 14, then it follows that the maximum pressure of the low pressure range is also determined by the distance valve 50 moves before its movement is stopped by pin 56 and holes 55. The distance to be moved by valve 50 is predetermined, and appropriate pin and holes are provided in relief valve 50 and inlet valve 20, respectively, before they are assembled into body 10 of the pressure reducing regulator. Once it is established, this distance remains constant to provide a uniform range or pressure difference between the minimum and maximum values of the low pressure range; consequently the minimum value may be altered by altering the position of adjusting cap 59 without changing the difference between the minimum and maximum values. This arrangement is another important feature of the invention.

After relief valve 50 has opened, and a sufficient volume of air has escaped through relief port 44, air pressure in chamber 14 decreases, and piston 40, under the influence of spring 41, moves downward until valve seat 45 is again in full engagement with the spherical surface of valve head 51 to thereby close relief port 44. When the relief port is completely closed, the end of valve stem 53 of valve 50 transfers pressure from spring 41 to inlet valve 20; therefore as pressure in outlet chamber 14 continues to decrease, spring 41, through piston 40, valve seat 45, and relief valve 50, overcomes the force of spring 36 and moves inlet valve 20 so that inlet port 16 is opened. Thus, a loss of air pressure in the outlet chamber permits piston 40 to return to its second position through which it passes to completely close relief port 44 and open inlet port 16 in the piston's return movement toward its first position. The opening of the inlet port will again increase the pressure in the outlet chamber and cause the inlet valve to close the inlet port as previously described. This opening and closing action of inlet valve 20 occurs with a frequency determined by the volume of air flowing from the outlet chamber, while the relief valve 50 may open and close port 44 only occasionally.

In Fig. 3, the unseating of valve head 51 from valve seat 45 is exaggerated to permit the use of arrows to indicate the flow of air through port 44, bore 42, and holes 43 into the spring compartment 57.

Fig. 4 illustrates a complete and full opening between the spherical surface of valve head 51 and valve seat 45.

It further shows relief valve 50 and inlet valve 20 oriented 90 degrees from their position as shown in Fig. 3 to illustrate the axial relationship between holes 55 and pin 56, and the reengagement of the end of stem 52 with the bottom wall 24 of valve 20 when relief valve 50 is in its fully opened position.

It is to be noted that the diameter of inlet port 16 and the diameter of bore 28 which receives cylindrical body 21 of valve 20 are substantially equal, and that holes 27 interconnect bore 23 and bore 26 in body 21; therefore valve 20 is a balanced valve, and is unaffected by air pressure in either or both chambers. In other words valve 20 moves only in response to the forces exerted by springs 36 and 41. Another feature of this invention is the manner in which valve seat 18 and valve guide 30 are sealed against pressure loss in the bore forming inlet pressure chamber 12 by O rings 11 and 13 respectively.

The coaxial arrangement of inlet valve 20, spring 36, relief valve 50, piston 40, and spring 41 provide a pressure reducing and regulating valve which is easy to manufacture and simple to operate.

What is claimed as new is:

1. In a fluid-pressure reducing and regulating valve having inlet and outlet pressure chambers with a connecting passageway, a spring-actuated valve adapted for closing said passageway, a spring-loaded piston having an exhaust port and adapted for movement in response and proportion to fluid-pressure in the outlet chamber, and means responsive to such piston movement for maintaining the magnitude of such fluid-pressure between preselected minimum and maximum values having a fixed difference, said means comprising: a control element interconnecting the spring-loaded piston and the spring-actuated valve such that the force of the piston loading-spring effects a closed condition of the exhaust port and an open condition of the connecting passageway while fluid-pressure in the outlet chamber is less than the preselected minimum value, and such that movement of the spring-loaded piston is accompanied by movement of the spring-actuated valve for effecting a closed condition of said passageway while maintaining the closed condition of said exhaust port when outlet chamber pressure equals the preselected minimum value; said control element being constructed to respond to fluid-pressure such that the closed condition of said exhaust port is maintained by fluid-pressure in the outlet chamber after the passageway-closing action of the spring-actuated valve; and means associated with the connection between said control element and the spring-actuated valve for effecting an open condition of the exhaust port when the spring-loaded piston has moved in response and proportion to fluid-pressure in the outlet chamber having a value exceeding the preselected maximum, said last named means being characterized by its ability to permit a fixed amount of free relative movement of the control element with respect to the spring-actuated valve to provide a fixed difference between the fluid-pressure required to effect closure of the connecting passageway and the fluid-pressure required to open the exhaust port, and by its ability to permit said control element to position itself such that reclosure of the exhaust port is effected when fluid-pressure in the outlet chamber has decreased to a value substantially equal to the preselected minimum.

2. In a fluid-pressure reducing and regulating valve having inlet and outlet pressure chambers with a connecting port, a spring-actuated valve adapted for closing the connecting port, a spring-loaded piston having an exhaust port and adapted for movement in response and proportion to fluid-pressure in the outlet chamber, and means responsive to movement of the piston for maintaining the magnitude of such fluid-pressure between preselected minimum and maximum values, said means comprising: a control element having a first end-portion closingly associated with the exhaust port of said piston and a second end-portion associated with the spring-actuated valve, said control element being arranged such that the piston loading-spring causes the first and second end-portions to engage the exhaust port of the piston and the spring-actuated valve, respectively, to concurrently effect closure of said exhaust port and prevent closure of the connecting port until fluid-pressure in the outlet chamber equals the preselected minimum value, said control element being so constructed that port-closing engagement between the first end-portion and the exhaust port provides an unbalanced condition of said control element with respect to fluid-pressure in the outlet chamber such that this fluid-pressure is effective for maintaining the closed condition of said exhaust port independently of the piston loading spring; and disengaging means associated with the spring-actuated valve and said control element for causing the first end-portion of said element to disengage the exhaust port when fluid-pressure in the outlet chamber exceeds the preselected maximum, said disengagement being effective for providing a balanced condition of said control element with respect to fluid-pressure in the outlet chamber and to permit this fluid-pressure to decrease to a value substantially equal to the preselected minimum, whereupon the piston loading-spring operates to cause the first and second end-portions of the control element to reengage the exhaust port and the spring-actuated valve, respectively, for closing the exhaust port, and for opening the connecting port.

3. A fluid-pressure reducing and regulating valve for reducing high-level fluid-pressures to low-level fluid-pressures and for automatically regulating the magnitude of the low-level pressures between preselected minimum and maximum values above atmospheric pressure, said valve comprising: a housing having inlet and outlet chambers with an interconnecting passageway; a spring-actuated valve element for closing said interconnecting passageway, said valve element having surface areas exposed to fluid-pressures in both inlet and outlet chambers, said surface areas being so constructed and arranged that the effect of such pressures against said areas results in a balance of forces, whereby astatic tendencies in the actuation of said valve element are prevented; a spring-loaded piston, having an exhaust port, adapted for movement in response and proportion to fluid-pressure in the outlet chamber, said exhaust port being adapted for exhausting outlet-chamber fluid-pressure to atmosphere; a control element responsive to movement of the piston for regulating the magnitude of the low-level fluid-pressures between the preselected minimum and maximum values, said control element having a first end-portion closingly associated with the exhaust port of said piston and a second end-portion associated with the spring-actuated valve element, said control element being arranged such that the piston loading-spring causes the first and second end-portions to engage the exhaust port of the piston and the spring-actuated valve element, respectively, to concurrently effect closure of said exhaust port and prevent closure of the interconnecting passageway until fluid-pressure in the outlet chamber equals the preselected minimum value, and said control element being so constructed that port-closing engagement between the first end-portion and the exhaust port provides an unbalanced condition of said control element with respect to fluid-pressure in the outlet chamber such that this fluid-pressure is effective for maintaining the closed condition of said exhaust port independently of the piston loading-spring; and disengaging means associated with the spring-actuated valve element and said control element for causing the first end-portion of said control element to disengage the exhaust port when the spring-actuated piston movingly responds to fluid-pressure exceeding the preselected maximum, said disengagement being effective for providing a balanced condition of said control element with respect to fluid-pressure in the outlet chamber and to permit this fluid-pressure to decrease to a value substantially equal to the preselected minimum, whereupon the piston loading-spring operates to cause the first and second end-portions of the control element to reengage the exhaust port and the spring-actuated valve, respectively, for closing the exhaust port, and for opening the interconnecting passageway as fluid-pressure in the outlet chamber decreases below the preselected minimum value.

4. The combination defined in claim 3 in which said disengaging means comprises a loose mechanical connection between the control element and the spring-actuated valve element adapted to provide a limited amount of free relative movement between said elements after said valve element has closed the chamber-connecting passageway so that the port-closing engagement of the first end-portion of said control element results solely from fluid-pressure in the outlet chamber, and such that disengagement of said first end-portion from said exhaust port results from the limiting characteristic of the loose mechanical connection.

References Cited in the file of this patent

UNITED STATES PATENTS

| | | |
|---|---|---|
| 331,544 | Reinecke | Dec. 1, 1885 |
| 1,461,738 | Rumpf | July 17, 1923 |
| 2,252,152 | Work | Aug. 12, 1941 |
| 2,416,570 | Coleman | Feb. 25, 1947 |
| 2,487,650 | Grove | Nov. 8, 1949 |

FOREIGN PATENTS

| | | |
|---|---|---|
| 156,543 | Germany | July 10, 1939 |
| 582,051 | Great Britain | Nov. 4, 1946 |
| 606,410 | Great Britain | Aug. 12, 1948 |